United States Patent
Aymong

(10) Patent No.: US 6,605,224 B2
(45) Date of Patent: Aug. 12, 2003

(54) COALESCER APPARATUS IN AN OIL/WATER SEPARATOR

(75) Inventor: Gregory G. Aymong, Mt. Sinai, NY (US)

(73) Assignee: Highland Tank and Manufacturing Company, Stoystown, PA (US)

(*) Notice: Subject to any disclaimer, the term of this patent is extended or adjusted under 35 U.S.C. 154(b) by 240 days.

(21) Appl. No.: 09/915,077

(22) Filed: Jul. 24, 2001

(65) Prior Publication Data

US 2003/0019821 A1 Jan. 30, 2003

(51) Int. Cl.$^7$ ............................................. B01D 21/00
(52) U.S. Cl. .................. 210/802; 210/521; 210/538; 210/DIG. 5
(58) Field of Search ................. 210/801, 802, 210/521, 522, 532.1, 538, 540, DIG. 5

(56) References Cited

U.S. PATENT DOCUMENTS

| | | | | |
|---|---|---|---|---|
| 2,014,431 A | * | 9/1935 | Foster | 210/521 |
| 2,214,248 A | * | 9/1940 | Muwley | 210/DIG. 5 |
| 3,957,656 A | * | 5/1976 | Castelli | 210/521 |
| 4,042,512 A | * | 8/1977 | McCarthy et al. | 210/521 |
| 4,067,813 A | * | 1/1978 | Pielkenrood | 210/521 |
| 4,273,654 A | | 6/1981 | Pielkenrood | 210/522 |
| 4,278,545 A | * | 7/1981 | Batutis et al. | 210/DIG. 5 |
| 4,437,988 A | * | 3/1984 | James | 210/540 |
| 4,722,800 A | * | 2/1988 | Aymong | 210/521 |
| 5,028,333 A | | 7/1991 | Wright et al. | 210/521 |
| 5,242,604 A | * | 9/1993 | Young et al. | 210/DIG. 5 |
| 5,326,474 A | * | 7/1994 | Adams et al. | 210/521 |
| 5,520,825 A | * | 5/1996 | Rice | 210/540 |
| 5,928,524 A | * | 7/1999 | Casola | 210/802 |
| 6,056,128 A | * | 5/2000 | Glasgow | 210/521 |

OTHER PUBLICATIONS

Mercer International, Inc., Mercer International Compliance Master Multi–Pack Oil/Water Separator Literature, Copyrighted 1991.
Pielkenrod Separator Company, Pilkenrod Separator Company Literature, Cross Flow Plate Pack Description, Sep. 8, 1981.
American Petroleum Institute, Monographs on Refinery Environmental Control—Management of Water Discharges, Design and Operation of Oil–Water Separators, Feb. 1990, 25–30.

* cited by examiner

Primary Examiner—Christopher Upton
(74) Attorney, Agent, or Firm—Paul A. Beck & Associates

(57) ABSTRACT

A coalescer apparatus is used in oil-water separator tanks. The coalescer includes a frame that supports coalescing plates that are inclined upwardly from the bottom of the frame member. The coalescing plates run parallel with each other and are spaced equally apart. The coalescing plates have a bottom surface that is corrugated and a top surface that is flat without corrugations. Water containing oil and solids is passed through the coalescing apparatus and separation of the oil and solids from the water occurs. The solids fall to the top flat surface of the inclined coalescing plates. The inclined flat surface cause the solids to slide down the plate and out of the coalescer.

17 Claims, 2 Drawing Sheets

COALESCER APPARATUS IN AN OIL/WATER SEPARATOR

FIELD OF THE INVENTION

Figure 1:
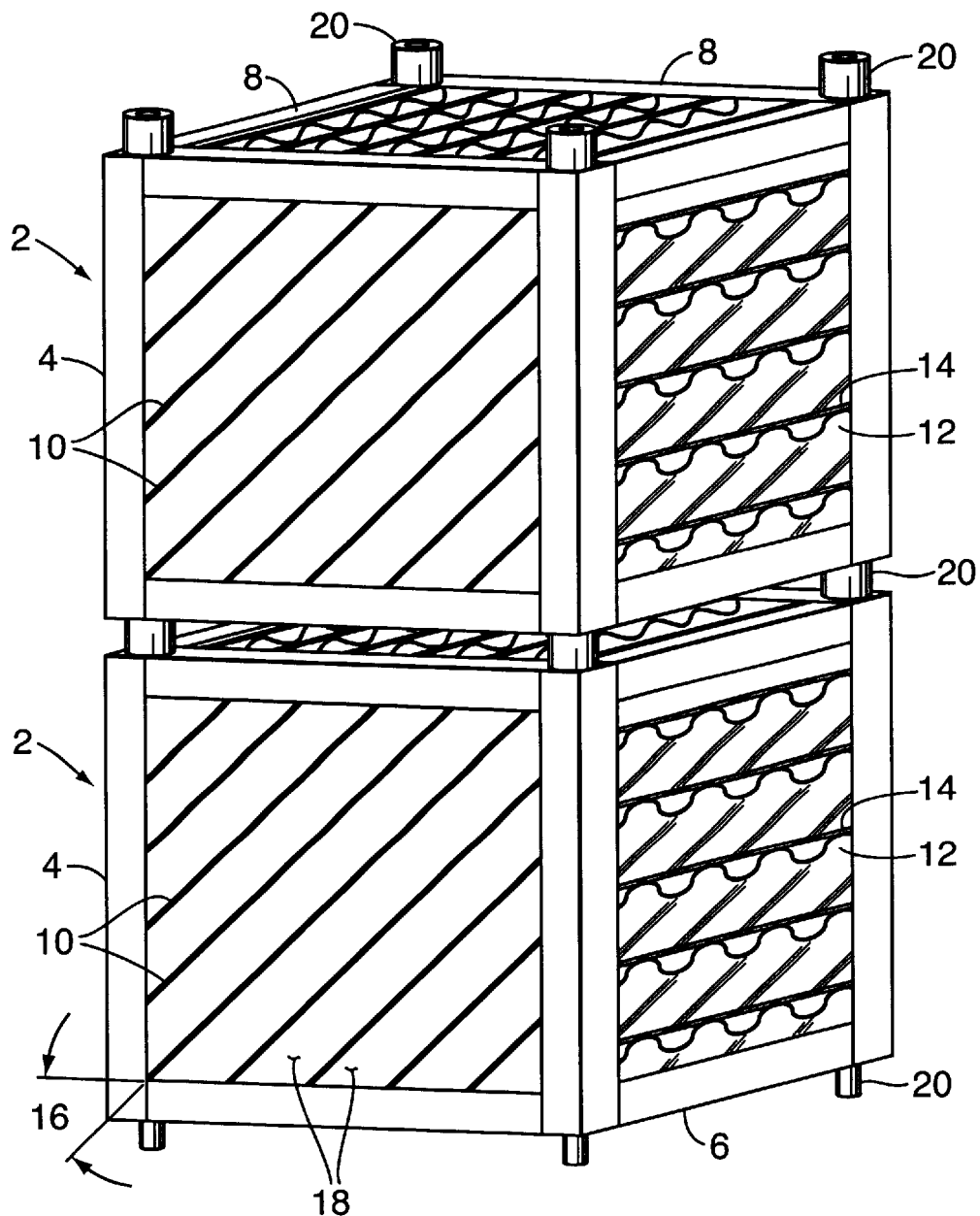

This invention relates to a coalescer apparatus which is used in an oil-water separator tank. The apparatus permits separation of mixtures containing immiscible liquids and solids without the settleable solids clogging the coalescing apparatus.

The coalescer apparatus is useful in an oil-water separator tank. Oil-water separator tanks are usually installed underground to handle oil-water run offs. The oil-water run offs contain mixtures of immiscible liquids and solids that enter into the separator tank through an inlet. The inlet channels the flow of the mixture toward the coalescer apparatus. The first style coalescers were made up of flat stacked plates that are inclined upwardly from the bottom of the separator tank. This type of coalescer is desirable for solid separation but it is undesirable for oil separation because it is inefficient for oil separation. In order to make the coalescer more efficient another style of coalescer was developed that would use corrugated plates instead of the flat plates. These corrugated plates make oil separation more efficient but they also may be undesirable because they require extensive maintenance if solids are involved with the separation. Therefore, it is desirable to have a coalescer that is efficient in separating oil and setteable solids without having to perform extensive maintenance on the coalescer.

The present invention provides a structure for efficiently separating immiscible liquids and setteable solids without clogging that leads to extensive shutdown and maintenance. This is done by making the coalescer apparatus with coalescing plates that are flat on their top surfaces and corrugated on their bottom surfaces. The corrugations are present to cause the efficient separation of oil and water, while the flat surfaces cause more efficient separation of solids.

BACKGROUND OF THE INVENTION

There are various needs for coalescer apparatus. Various styles of coalescer apparatuses have been used in the past 25 years to enhance gravitational separation. These coalescers are positioned in oil-water tank separators so that the flow of a mixture containing immiscible liquids and solids transgresses through the coalescer apparatus. Increasingly stringent governmental regulations on the treatment and discharge of oily wastewater have created a need for oil water separator tanks. The following is a list of Federal Regulations that have increased the demand for oil-water separators:

1) NPDES (National Pollutant Discharge Elimination System) Permits. These permits cover the discharge of process waste water. Regulations have been created that establish standards for the issuance of the permits;
2) SPCC (Spill Prevention Control and Countermeasure) plans and OPA (Oil Pollution Act). This has created wastewater disposal problems because there is a push for containment to trap spilled oil;
3) Sewer Discharge Regulations. This is a an EPA regulation that requires industries to pretreat wastewater from hazardous and toxic waste before it enters into municipal sewer systems; and
4) Toxicity Releases under EPA's TCLP (Toxicity Characteristics Leaching Procedure). Requiring that Wash water is classified as process wastewater and cannot be discharged without treatment.

Typical places that oil-water separators are used are Airports and Aircraft Services, Automobile Dealerships, Bus Companies, Construction Companies, Emergency Services, Gasoline Service Stations, Hazardous Waste Sites, Industrial Facilities, Military and Governmental Installations, Municipal Sewer Treatment Plants, Parking Areas and Buildings, Petro-Chemical Plants, Petroleum Marketing and Storage Facilities, Railroad Yards, Refineries, Steel Mills, Trucking and Transportation Companies, and Utility Switch Yards.

The initial type of coalescer apparatus used flat plates stacked parallel with one another and inclined upwardly from the bottom the separator tank. This type of coalescer was used primarily to enhance sedimentation for solid separation from liquids. Once the flow of the immiscible solid-liquid mixture hits the plates it causes the flow to be split into multiple streams each flowing through the stacked plates. The solids and liquids then begin to gravametrically separate once they are in the coalescer. The solids fall to a top surface of the coalescing plates while the liquid with the lower specific gravity rises to a bottom surface of the plate above it. Because these plates are inclined the solids slide down the top of the plate and fall to the bottom of the tank. This type of coalescer apparatus can be seen in U.S. Pat. No. 5,028,333 Phase Separator Module issued Jul. 2, 1991 to Wright et al. The literature marketing this type of coalescer promotes the use of flat plate The advantage of this type of coalescer is that the flat plates allow the settleable solids to slide down to the bottom of the tank thus reducing clotting and clogging of the coalescer apparatus. However, this type of coalescer is not very efficient in separating oil from water because it allows rising oil droplets to pass through and out the coalescer with little removal.

To improve on this inefficient means of separation later versions of the coalescer used corrugated plates that are stacked so that the corrugations are parallel to each other and perpendicular to the fluid flow of the mixture of oil and water. The corrugations cause alternating acceleration and deceleration of the fluid flow of the mixture of oil and water. This causes rising oil droplets to collide more frequently. The more frequent collisions increase coalescence. Coalescence is the action of smaller droplets joining to form droplets with greater and greater diameter. Coalescence of the oil droplets creates a more efficient oil-water separator because the rate of separation is proportional to the square of an oil droplet's diameter. This type of separator is very efficient for separating oil-water, but is inefficient for solid separation.

The solids get caught in the corrugations and cannot fall down to the bottom of the oil-water separator tank. The setteable solids cause clotting and clogging of the coalescer. In order to clear the solids from the coalescer apparatus the whole separator needs to be shut down. This type of clogging and clotting leads to extensive shutdown for cleaning and major maintenance.

There is no known method that provides a means for efficient oil-water separation of liquids and solids without the problems of clotting and clogging. The present invention solves the problem by providing a coalescer apparatus which permits coalescence of the oil-droplets and allows solids to be deposited at the bottom of the oil-separator to prevent clotting and clogging of the coalescer plates.

SUMMARY OF THE INVENTION

The present invention provides a coalescer apparatus for use in an oil water separator tank for separating oil and solids from water. The apparatus has a frame member having a bottom portion and a top portion which supports a plurality of coalescing plates. The coalescing plates are spaced equally apart from each other and run parallel to each other. The coalescing plates are inclined upwardly from the bottom portion of the frame member to the top portion of the frame member. Each coalescing plate has a bottom surface that has corrugations and a top surface that is flat without corrugations. The present invention also provides a coalescer apparatus in which the coalescing plates are spaced between ¼ inch to 3 inches, and the coalescing plates are inclined from an angle of 45 to 60 degrees from the bottom portion of the frame member.

The invention additionally provides for a frame member that has interlocking members extending from the frame member for stacking at least two frame members vertically. The invention will also provide for at least two frame members each with interlocking members and are stacked so that the respective interlocking members are engaged.

The invention also provides for either an oil water separator tank with a rectangular cross section or a cylindrical cross section having a means for channeling fluid flow in the tank from a an inlet end toward a coalescer apparatus and to an outlet end. The coalescer apparatus has a sludge baffle between the bottom of the coalescer apparatus and the bottom of the tank. The coalescer apparatus also has side plates extending from the coalescer apparatus to the walls of the tank to prevent fluid flow from bypassing the coalescer apparatus. The coalescer apparatus is positioned within the tank and has a frame member with a bottom portion and top portion which supports a plurality of coalescing plates. The coalescing plates are inclined upwardly from the bottom portion of the frame member to the top portion of the frame member. Each coalescing plate has a bottom surface that has corrugations and a top surface that is flat without corrugations. The coalescer apparatus is placed so that the corrugations on the coalescing plates are positioned transversely to the channeled flow of the fluid in the tank.

The present invention also provides for a separator tank with a coalescer apparatus in which the coalescing plates are spaced between ¼ inch to 3 inches, and the coalescing plates are inclined from an angle of 45 to 60 degrees from the bottom portion of the frame member. The invention additionally provides for a for frame member that has interlocking members extending from the frame member for stacking at least two frame members vertically. The invention will also provide for at least two frame members each with interlocking members and are stacked so that the respective interlocking members are engaged.

The invention additionally provides for a separator tank with an access chamber of a size sufficient to permit insertion of the coalescer apparatus into the tank.

The invention also provides for a separator tank with a coalescer apparatus that has a sludge hopper below the coalescer apparatus to receive settling solids.

I provide a method to separate oil and solid material from water by providing a separating tank with an inlet and outlet end. A flow of water is channeled in the tank toward a coalescer apparatus having a plurality of parallel coalescing plates spaced apart with corrugations on the bottom surface of each plate and with a top surface which is flat without corrugations. The coalescing plates are positioned so that the corrugations of the plates are positioned transverse to the flow of the fluid and the plates are inclined at an angle of between 45 and 60 degrees. The flow passes through the coalescing plates where the oil droplets rise to the bottom of the coalescer plates causing the oil droplets to coalesce. The solids fall to the tops of the coalescing plates that have a flat surface. Because the coalescing plates are angled the settleable solids slide downwardly to the bottom of the tank. The coalescer apparatus has a sludge baffle between a bottom of the coalescer apparatus and the bottom of the tank and has side plates extending from the coalescer to the walls of the tank.

A BRIEF DESCRIPTION OF THE DRAWINGS

Figure 2:
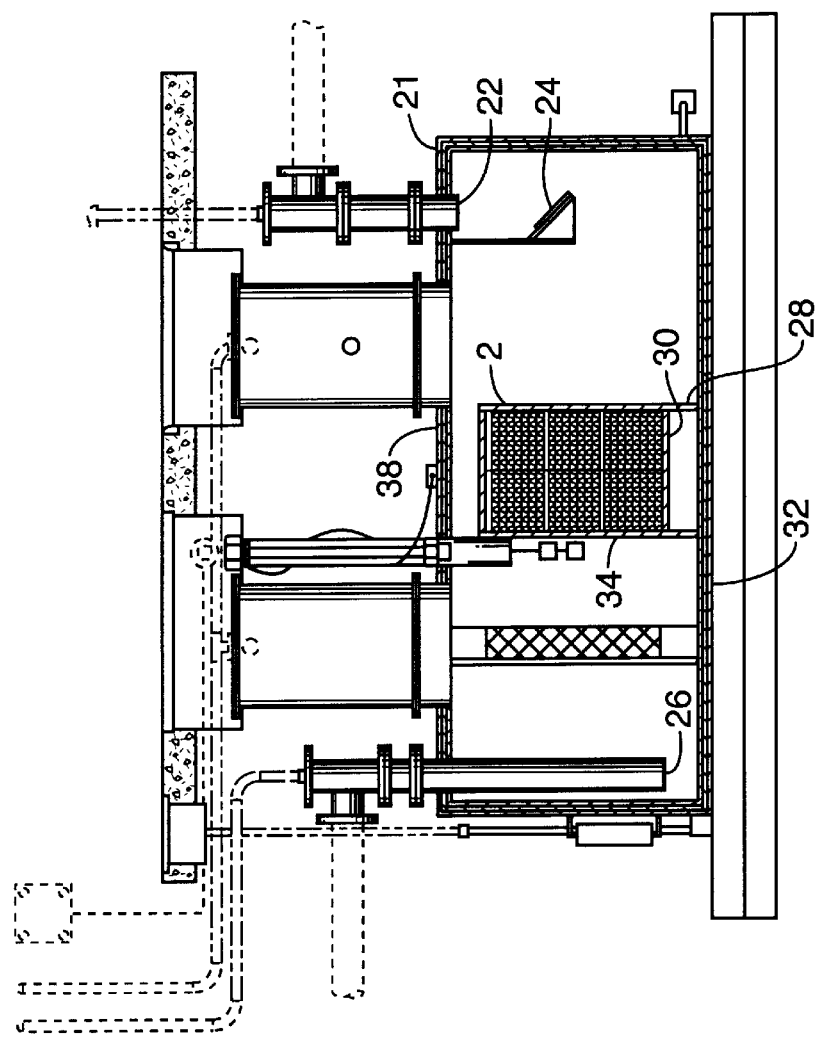
Figure 3:
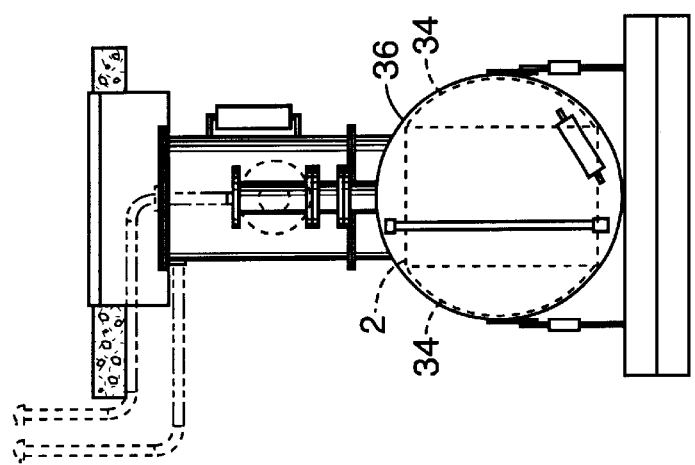

FIG. 1 A full view of the coalescer apparatus stacked with another coalescer apparatus;

FIG. 2 A side view in elevation of an oil-water separator containing a coalescer apparatus; and FIG. 3 An end view in elevation of an oil-water separator tank.

DETAILED DESCRIPTION OF A PREFERRED EMBODIMENT

Definitions

"Coalescence" means the action of small droplets merging together to form larger droplets. In the case of oil in water, small drops until they become buoyant and float to the surface.

"Oil" means a generic term that includes hydrocarbons, animal oil, vegetable oil, etc.

"Oil-Water Separator" means a wastewater treatment tank that relies on gravity to separate lighter-than-water oil globules from water. The performance of the separator varies with the characteristics of the liquids and the design separator.

"Separation" means any of several techniques to take contaminants from wastewater.

Description

FIG. 1 shows a coalescer apparatus 2. The coalescer apparatus 2 has a frame member 4. The frame member 4 has a top portion 8 and a bottom portion 6. There are a plurality of coalescing plates 10 running parallel to each other supported by the frame member 4. The coalescing plates 10 have a corrugated bottom surface 12 to increase coalescence in the rising liquid droplets. The coalescing plates 10 have a flat top surface 14 without corrugations. The coalescing plates 10 are inclined upwardly from the bottom portion 6 of the frame member 4 at angle 16 from 45 to 60 degrees to the top portion 8. The coalescing plates 10 are spaced 18 between ¼ inch to 3 inches apart. There are interlocking 20 extending from the frame member 4 for stacking the coalescer apparatus 2. Two coalescer apparatuses 2 are stacked vertically.

As fluid flow that contains immiscible solids and liquids is passed through the coalescer apparatus 2 separation begins. The immiscible liquid (oil) droplets rise to the bottom corrugated surface of the coalescing plates 12. As droplets of the immiscible liquid move up and down the corrugations 12 they move at different speeds causing the droplets to collide with each other. These collisions cause the droplets to coalesce thus giving them a bigger diameter. Once the droplets pass through the coalescer they rise to the top 38 to form a surface layer that can easily be removed. Simultaneously the solids fall to the top flat surface 14 of the coalescing plates 10. Because the coalescing plates 10 are angled 16 from the bottom frame member 6 the solids slide down the flat surface 14 of the coalescer plates and fall out of the coalescer apparatus 2.

FIG. 2 shows the coalescer apparatus 2 used in an oil water separator tank 21. The oil water separator tank 21 depicted is a type of oil-water separator tank defined in U.S. Pat. No. 4,722,800 Oil-Water Separator issued Feb. 2, 1988 to Gregory G. Aymong. The oil water separator tank 21 can have either a cylindrical cross-section (as shown), or a rectangular cross-section, and can have an access chamber. The tank has an inlet end 22 and an outlet end 26. Located near the inlet end 22 there is a means for channeling fluid flow 24 from the inlet end 22 through the coalescer apparatus 2 towards the outlet end 26. The tank also has a sludge baffle 28 extending from the bottom 30 of the coalescer apparatus 2 to the bottom 32 of the tank in order to prevent fluid from passing under the coalescer apparatus 2. There are side plates 34 that extend from the coalescer apparatus 2 to the wall 36 of the separator tank 21 to ensure that fluid flow passes through the coalescer apparatus 2 (see FIG. 3). Once the fluid flow is channeled though the coalescer apparatus 2 separation occurs. The solids fall to the bottom of the tank near the sludge baffle 28. The oil droplets float to the top 38 of the tank 21 creating an oil layer that can be pumped out of the tank 21. The separated water layer is on the bottom portion of the tank 21 in the outlet end 26. The water can then flow through the outlet end 26. This same separation process is used in a separator tank with an access chamber or with a rectangular cross section.

As various changes could be made in the above construction and method without departing from the scope of the invention, it is intended that all matter contained in the above description as shown in the accompanying drawings shall be interpreted as illustrative and not as a limitation.

I claim:

1. A coalescer apparatus for use in an oil-water separator tank for separating oil and solids from water comprising:
   (a) a frame member having a bottom portion and a top portion; and
   (b) a plurality of coalescing plates, spaced from each other and parallel to each other and inclined upwardly from the bottom portion toward the top portion and supported within the frame member, each coalescing plate having a bottom surface and a top surface, the bottom surface having corrugations, the top surface being flat and without corrugations.

2. A coalescer apparatus as recited in claim 1 in which the coalescing plates are spaced between ¼ inch to 3 inches.

3. A coalescer apparatus as recited in claim 1 in which the coalescing plates are inclined from an angle of 45 to 60 degrees from the bottom portion of the frame member.

4. A coalescer apparatus as recited in claim 1 which interlocking members are extending from the frame member, for stacking at least two frame members vertically.

5. A coalescer apparatus as recited in claim 4 having at least two frame members each in which interlocking members and stacked vertically and engaging respective interlocking members.

6. An oil water separator tank having a means for channeling fluid flow in the tank from an inlet end toward a coalescer apparatus and to an outlet end, the coalescer apparatus having a sludge baffle between a bottom of the coalescer apparatus and a bottom of the tank and having side plates extending from the coalescer apparatus to walls of the tank to prevent fluid flow from by-passing the coalescer apparatus, the improvement comprising:
   (a) the coalescer apparatus positioned within the tank and having a frame member with a bottom portion and a top portion; and
   (b) a plurality of coalescing plates supported within the frame member and spaced from each other and parallel to each other and inclined upwardly from the bottom portion toward the top portion, each coalescing plate having a bottom surface and a top surface, the bottom surface having corrugations, the top surface being flat and without corrugations.

7. An oil water separator tank as recited in claim 6 in which the coalescer apparatus is placed so that the corrugations on the coalescing plates are positioned transversely to the channeled flow of the fluid in the tank.

8. An oil water separator tank as recited in claim 6 in which the coalescing plates are spaced between ¼ inch to 3 inches.

9. An oil water separator tank as recited in claim 6 in which the coalescing plates are inclined from an angle of 45 to 60 degrees from the bottom portion of the frame member.

10. An oil water separator tank as recited in claim 6 in which interlocking members extend from the frame member, for stacking at least two frame members vertically.

11. An oil water separator tank as recited in claim 10 having at least two frame members each with interlocking members and stacked vertically and engaging respective interlocking members.

12. An oil water separator tank as recited in claim 6 in which the tank has an access chamber of a size to permit insertion of the coalescer apparatus into the tank.

13. An oil water separator tank as recited in claim 6 in which the tank has a rectangular cross section.

14. An oil water separator tank as recited in claim 6 where the tank has a cylindrical cross-section.

15. An oil water separator as recited in claim 6 having a sludge hopper below the coalescer apparatus to receive settling solids.

16. A method for separating oil and solid material from water comprising:
   (a) providing separator tank having an inlet and an outlet end;
   (b) channeling a flow of water having oil and solids in a tank toward a coalescer apparatus having a plurality of parallel coalescing plates spaced apart with corrugations on a bottom surface of each plate and a top surface being flat without corrugations in which the corrugations of the plates are positioned transversely to the flow of the fluid and the plates are inclined at an angle of between 45 and 60 degrees; and
   (c) passing the flow of water through the coalescing plates whereby the oil in the water coalesces within the corrugations and escapes from the top of the coalescing plates and the solids in the water fall to the top of the flat surface of the coalescing plates and slide downwardly to the bottom of the tank.

17. The method claim of 16 in which the coalescer apparatus has a sludge baffle between a bottom of the coalescer apparatus and the bottom of the tank and having side plates extending from the coalescer to the walls of the tank.

* * * * *

UNITED STATES PATENT AND TRADEMARK OFFICE
CERTIFICATE OF CORRECTION

PATENT NO. : 6,605,224 B2
DATED : August 12, 2003
INVENTOR(S) : Gregory G. Aymong It is certified that error appears in the above-identified patent and that said Letters Patent is hereby corrected as shown below:

Column 2,
Line 26, cancel beginning with "The advantage of this type of" and insert the following:
-- coalescers and argues against the use of corrugated plates. The advantage of this type of --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,605,224 B2
DATED : August 12, 2003
INVENTOR(S) : Gregory G. Aymong It is certified that error appears in the above-identified patent and that said Letters Patent is hereby corrected as shown below:

Column 4,
Line 23, cancel beginning with "drops until they become buoyant and float to the" insert the following -- droplets of oil coalesce into larger and larger drops until they become buoyant and float to the --

Column 5,
Line 48, cancel "claim 1 which" and insert -- claim 1 in which --

Signed and Sealed this

Twenty-sixth Day of October, 2004

JON W. DUDAS
*Director of the United States Patent and Trademark Office*